United States Patent [19]

Kuo

[11] Patent Number: 6,095,386

[45] Date of Patent: Aug. 1, 2000

[54] BICYCLE LOCK MOUNTING BRACKET

[76] Inventor: Lambert Kuo, No. 16, Lane 459, Sec. 1, An Ho Rd., Tainan, Taiwan

[21] Appl. No.: 09/342,551

[22] Filed: Jun. 29, 1999

[51] Int. Cl.[7] .................................................. B62J 11/00
[52] U.S. Cl. ........................ 224/448; 224/446; 224/461; 224/935; 248/230.1
[58] Field of Search ..................... 224/448, 935, 224/446, 461; 70/233; 248/229.1, 229.15, 229.16, 230.1, 230.6

[56] References Cited

U.S. PATENT DOCUMENTS 5,405,113  4/1995  Jaw ........................... 224/935
5,704,526  1/1998  Kuo ........................... 224/935

*Primary Examiner*—Linda J. Sholl
*Attorney, Agent, or Firm*—Jackson Walker L.L.P.

[57] ABSTRACT

A bicycle lock mounting bracket includes a frame clamp, a clamp latch secured to the frame clamp and containing a locking recess therein, a slide movably mounted in the clamp latch and including a hook movably received in the locking recess, and a lock clamp attached to the clamp latch and including an insert detachably received in the locking recess and containing an opening detachably receiving the hook of the slide.

12 Claims, 6 Drawing Sheets

BICYCLE LOCK MOUNTING BRACKET

CROSS-REFERENCES TO RELATED APPLICATIONS

Not Applicable.

BACKGROUND OF THE INVENTION

1. Field of the Invention

The present invention relates to a bicycle lock mounting bracket for a lock.

2. Description of the Related Art

A conventional bicycle lock mounting bracket in accordance with the prior art shown in FIG. 9 is used to attach a lock (not shown) to the frame (not shown) of a bicycle (not shown), and comprises a frame clamp (80) attached to the frame of the bicycle and including two elongated guide rails (81), and a lock clamp (82) secured to the lock and containing two guide grooves (83) each slidably receiving a guide rail (81), and a pawl member (84) pivotally mounted on the lock clamp (82) to lock the lock clamp (82) to the frame clamp (80). The pawl member (84) can be pivoted on the lock clamp (82) so as to detach the lock clamp (82) from the frame clamp (80), thereby detaching the lock from the frame of the bicycle. However, each of the guide grooves (83) has to align with the respective guide rail (81) so as to smoothly attach the lock clamp (82) to the frame clamp (80), thereby easily causing inconvenience to a user when he is in a hurry to attach the lock clamp (82) to the frame clamp (80). The present invention has arisen to mitigate and/or obviate the disadvantage of the conventional bicycle lock mounting bracket.

BRIEF SUMMARY OF THE INVENTION

In accordance with one aspect of the present invention, there is provided a bicycle lock mounting bracket comprising a frame clamp, a clamp latch secured to the frame clamp and containing a locking recess therein, a slide movably mounted in the clamp latch and including a hook movably received in the locking recess, and a lock clamp attached to the clamp latch and including an insert detachably received in the locking recess and containing an opening detachably receiving the hook of the slide.

Further benefits and advantages of the present invention will become apparent after a careful reading of the detailed description with appropriate reference to the accompanying drawings.

DETAILED DESCRIPTION OF THE INVENTION

Figure 1:
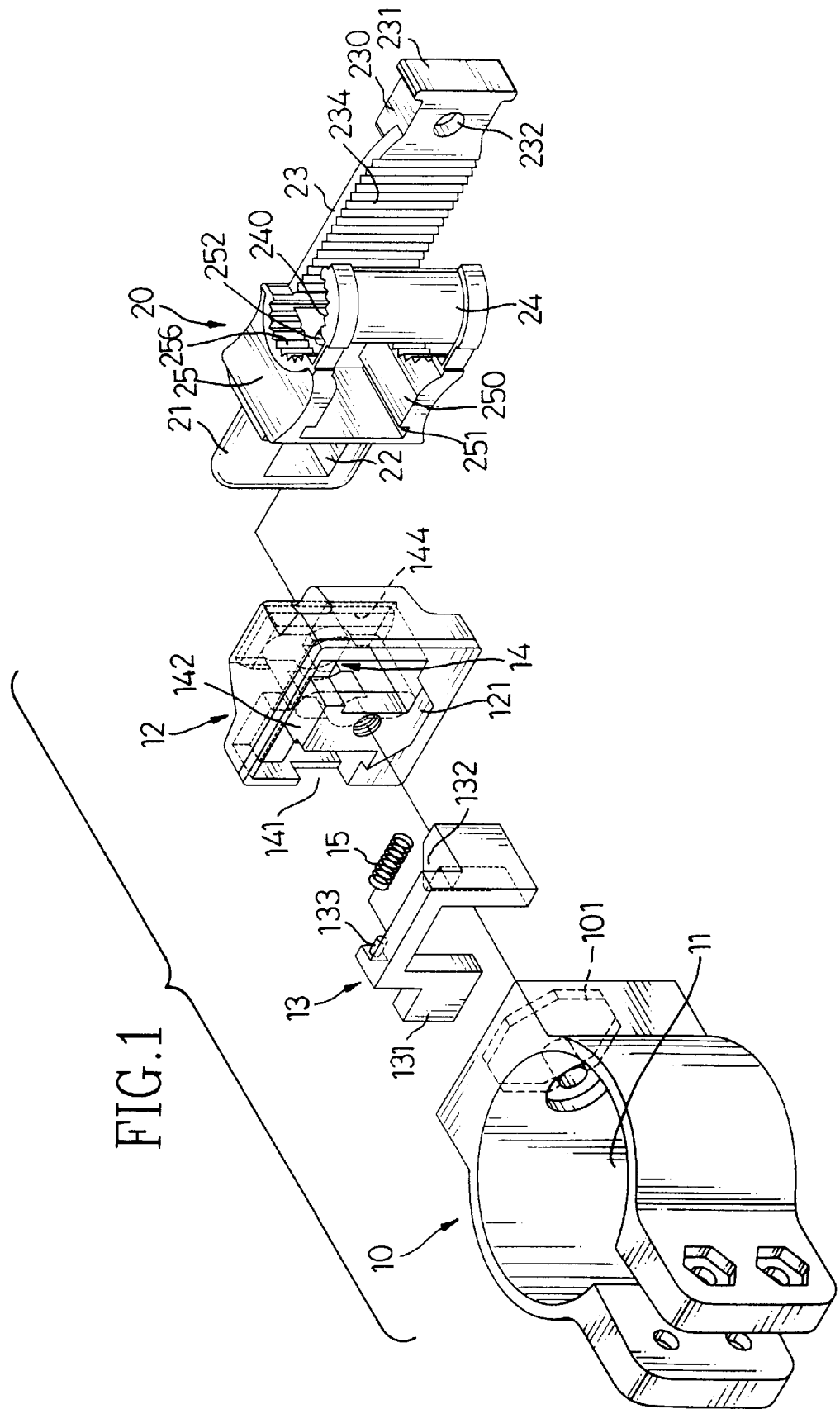
FIG. 1 is an exploded perspective view of a bicycle lock mounting bracket in accordance with the present invention.
Figure 3:
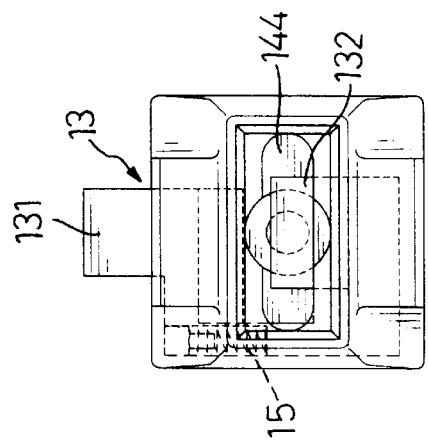
FIG. 3 is a front plan view of the bicycle lock mounting bracket in FIG. 2.
Figure 2:
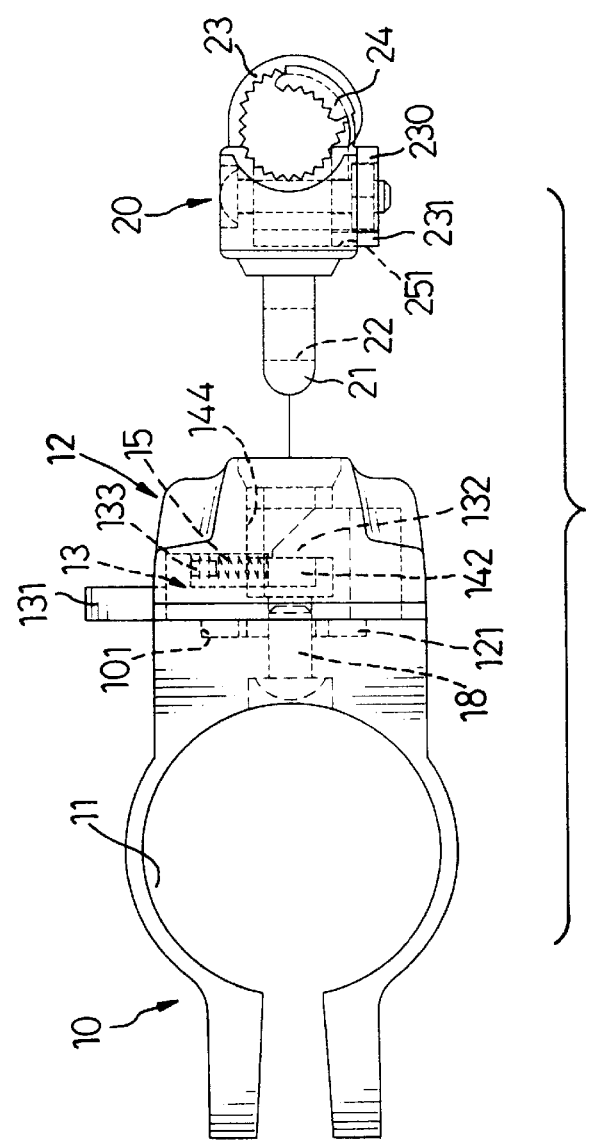
FIG. 2 is a top plan partial assembly view of the bicycle lock mounting bracket in FIG. 1.

Referring to the drawings and initially to FIGS. 1–3, a bicycle lock mounting bracket in accordance with the present invention is used to attach a lock (not shown) to the frame (not shown) of a bicycle (not shown).

The bicycle lock mounting bracket comprises a frame clamp (10) attached to the frame of the bicycle and containing a hole (11) to hold the frame, a clamp latch (12) secured to the frame clamp (10) and containing a locking recess (144), a slide (13) movably mounted in the clamp latch (12) and including a hook (132) movably received in the locking recess (144), and a lock clamp (20) attached to the lock and including an insert (21) detachably received in the locking recess (144) of the clamp latch (12) and containing an opening (22) in which the hook (132) of the slide (13) is detachably received.

The clamp latch (12) contains a chamber (14) slidably receiving the slide (13) therein and connecting to the locking recess (144). The clamp latch (12) contains a cavity (141) connecting to the chamber (14), and the slide (13) includes a press block (131) extending outward from the cavity (141). The clamp latch (12) includes a limit block (142) mounted in the chamber (14), the slide (13) includes a stub (133) separated from the limit block (142), and the bicycle lock mounting bracket further comprises a restoring spring (15) having one end held by the stub (133) and the other end abutting the limit block (142).

The frame clamp (10) contains a polygonal locking depression (101), and the clamp latch (12) includes a polygonal locking block (121) to mate with the locking depression (101) such that the clamp latch (12) is secured to the frame clamp (10) by means of a locking bolt (18).

The lock clamp (20) includes a body (25) having a closed sidewall and an open sidewall, and a strap (23) extending from the closed sidewall of the body (25) and having a distal end (230) received in the open sidewall of the body (25). The body (25) contains a channel (250) which extends through the open sidewall to receive the distal end (230) of the strap (23), and contains a locking hole (252) defined in the closed sidewall, and the distal end (230) of the strap (23) contains a locking bore (232) aligning with the locking hole (252). The channel (250) contains a retaining groove (251), and the distal end (230) of the strap (23) includes a locking piece (231) detachably received in the retaining groove (251).

The body (25) of the lock clamp (20) includes an arcuate limit post (24) extending from the open sidewall. The strap (23) includes multiple first teeth (234), the limit post (24) includes an inner wall formed with multiple second teeth (240) aligning with the first teeth (234), and the body (25) includes an arcuate portion formed with multiple third teeth (256) aligning with the first teeth (234) and the second teeth (240).

Figure 6:
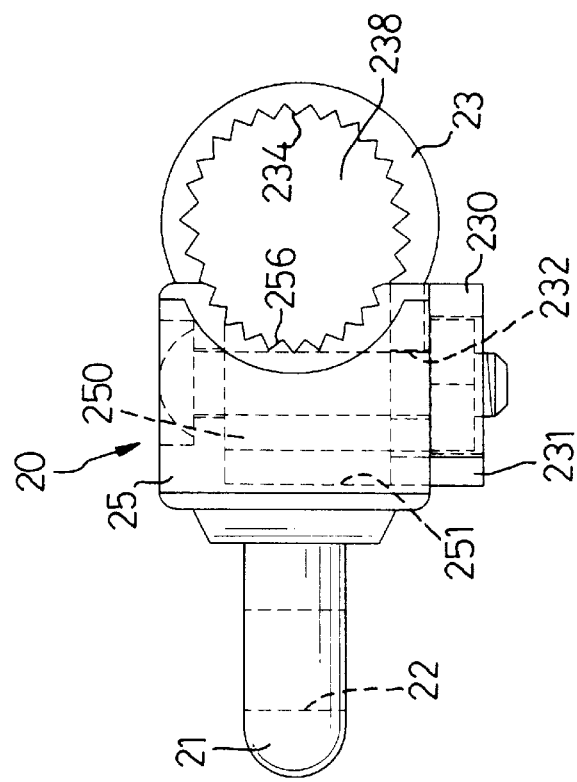
FIG. 6 is a top plan view of the bicycle lock mounting bracket lock clamp in FIG. 2.

Referring to FIG. 6 with reference to FIGS. 1–3, the distal end (230) of the strap (23) is inserted into the channel (250) with the locking piece (231) being received into the retaining groove (251). A locking bolt (26) then extends through the locking hole (252), the channel (250), and the locking bore (232), and a locking nut (262) is screwed onto the locking bolt (26), thereby securing the distal end (230) of the strap (23) to the body (25). In such a manner, the lock such as a U-shaped padlock, a cable lock and the like, can be received in the space (238) defined by the strap (23) such that the lock clamp (20) is attached to the lock.

Figure 7:
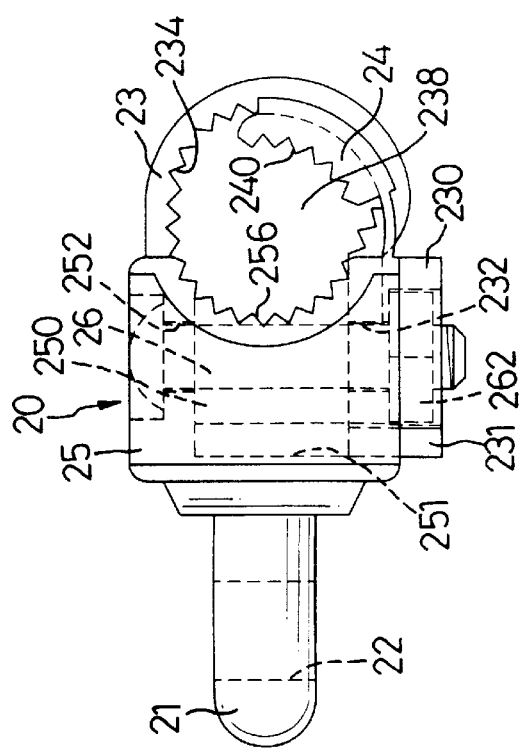
FIG. 7 is a top plan view of the bicycle lock mounting bracket lock clamp in accordance with another embodiment of the present invention.

Referring to FIG. 7 with reference to FIGS. 1–3, the arcuate limit post (24) is removed from the drawing, whereby the strap (23) defines a larger space (238) such that the lock clamp (20) can be attached to larger locks.

In operation, referring to FIGS. 1–6, the clamp latch (12) is attached to the frame clamp (10) that is initially attached to the frame of the bicycle, and the lock clamp (20) is initially attached to the lock.

The lock clamp (20) clamp latch insert (21) is inserted into the locking recess (144). Inserting the insert (21) farther will press and move the hook (132) outward until the opening (22) aligns with the hook (132) that snaps into the opening (22) by the force of the restoring spring (15), thereby locking the lock clamp (20) to the clamp latch (12) by means of the engagement between the hook (132) and the opening (22) so as to attach the lock to the frame of the bicycle.

Figure 5:
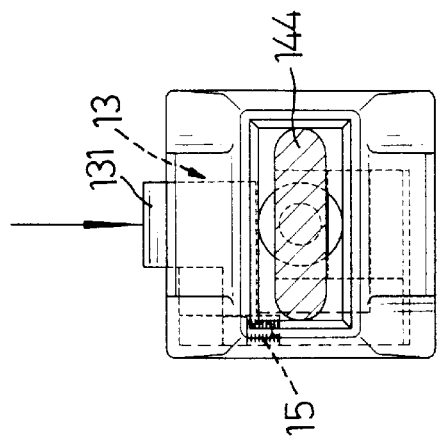
FIG. 5 is a front plan operational view of the bicycle lock mounting bracket in FIG. 3.
Figure 4:
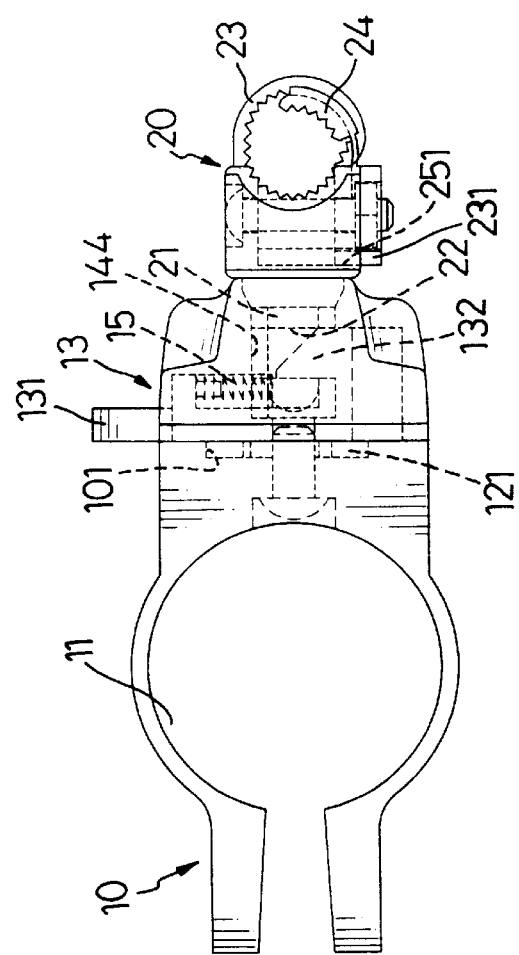
FIG. 4 is a top plan operational view of the bicycle lock mounting bracket in FIG. 2.

Referring to FIG. 5, the press block (131) of the slide (13) is pressed inward to release the hook (132) from the opening (22), thereby detaching the lock clamp (20) from the clamp latch (12) such that the lock is detached from the frame of the bicycle.

Figure 8:
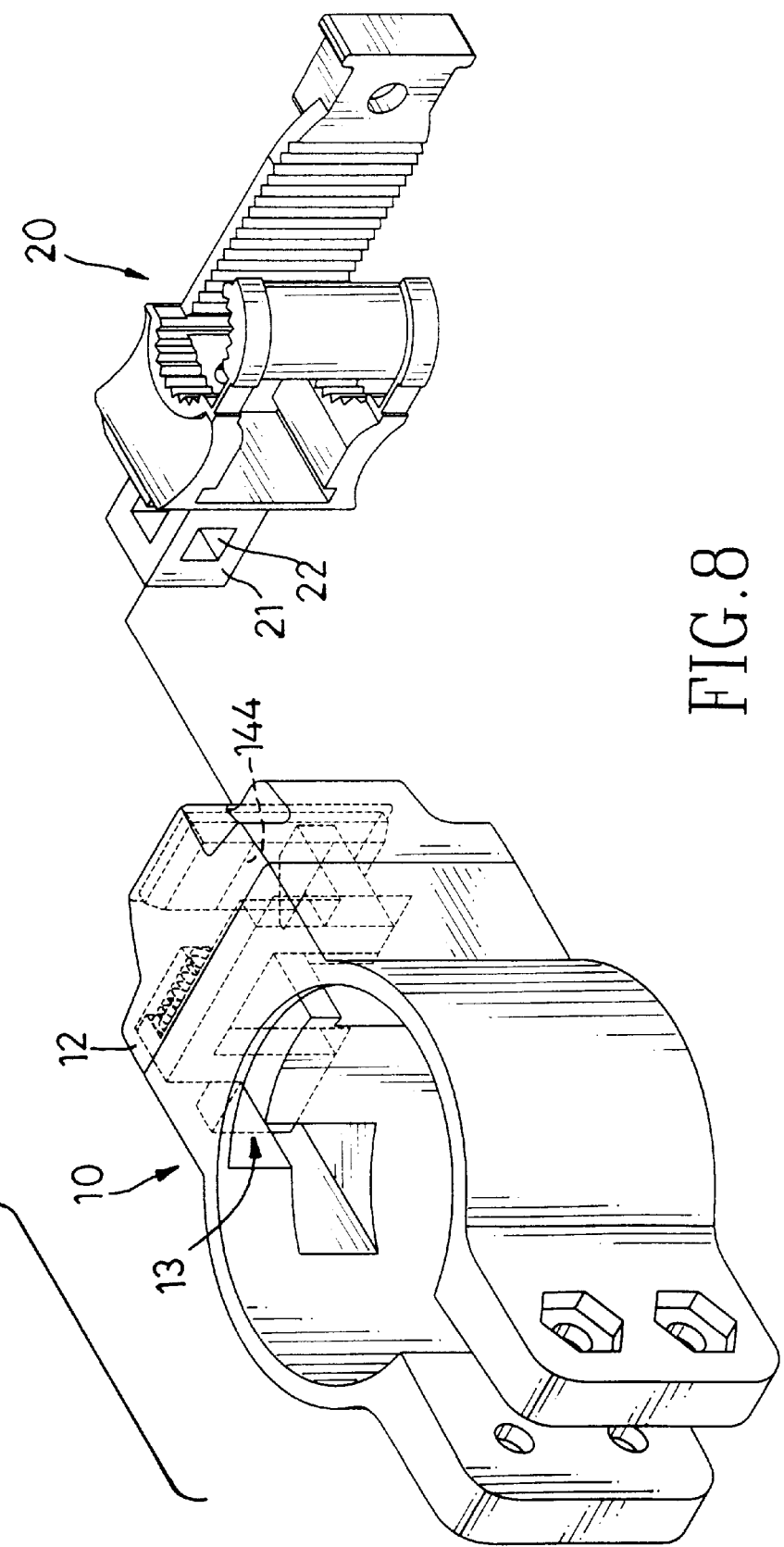
FIG. 8 is an exploded perspective view of a bicycle lock mounting bracket in accordance with another embodiment of the present invention.
Figure 9:
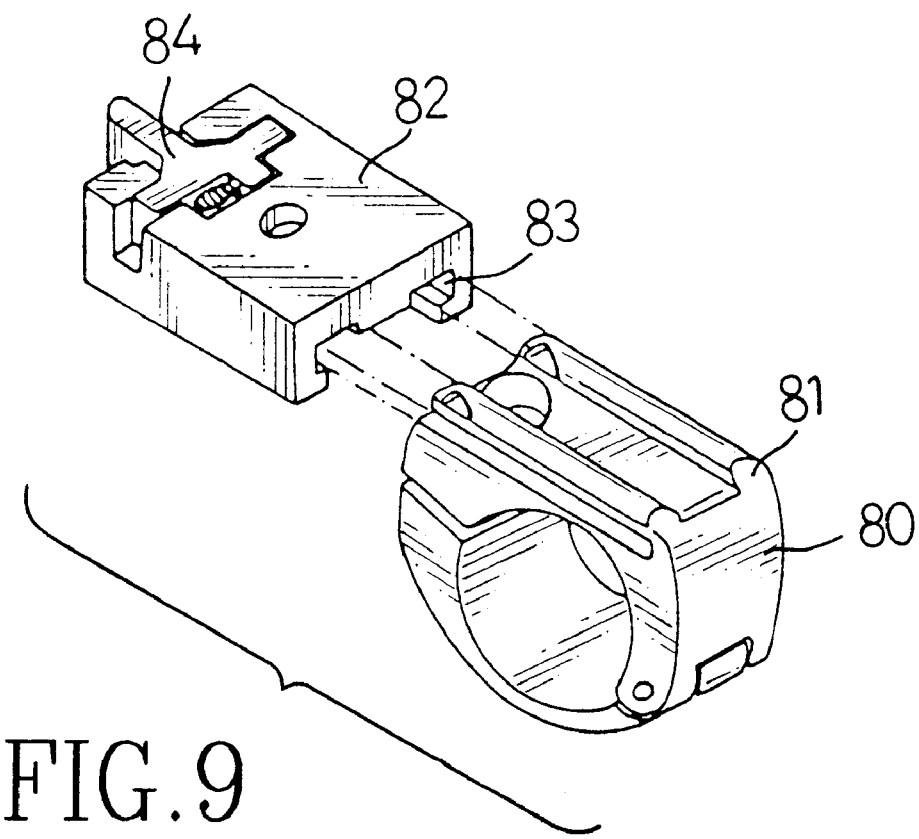
FIG. 9 is an exploded perspective view of a conventional bicycle lock mounting bracket in accordance with the prior art.

Referring now to FIG. 8 with reference to FIG. 1, in accordance with another embodiment of the present invention, the clamp latch (12) is integrally formed with the frame clamp (10), wherein the locking recess (144) of the clamp latch (12) has a square shape, and the insert (21) of the lock clamp (20) has a square shape mating with that of the locking recess (144).

In such a manner, the lock clamp (20) is easily attached to and detached from the clamp latch (12) so as to attach the lock to the frame of the bicycle, thereby facilitating a user operating and folding the lock.

It should be clear to those skilled in the art that further embodiments may be made without departing from the scope of the present invention.

What is claimed is:

1. A bicycle lock mounting bracket for a lock comprising:
   a frame clamp (10);
   a clamp latch (12) secured to said frame clamp (10) and containing a locking recess (144) therein;
   a slide (13) movably mounted in said clamp latch (12), and including a hook (132) movably received in said locking recess (144); and
   a lock clamp (20) attached to said clamp latch (12), and including an insert (21) detachably received in said locking recess (144), said insert (21) to containing an opening (22) detachably receiving said hook (132) of said slide (13) therein.

2. The bicycle lock mounting bracket in accordance with claim 1, wherein said clamp latch (12) contains a chamber (14) receiving said slide (13) and connecting to said locking recess (144).

3. The bicycle lock mounting bracket in accordance with claim 2, wherein said clamp latch (12) contains a cavity (141) connecting to said chamber (14), and said slide (13) includes a press block (131) extending outward from said cavity (141).

4. The bicycle lock mounting bracket in accordance with claim 2, wherein said clamp latch (12) includes a limit block (142) mounted in said chamber (14), said slide (13) includes a stub (133) separated from said limit block (142), and said bicycle lock mounting bracket further comprises a restoring spring (15) having one end held by said stub (133) and the other end abutting said limit block (142).

5. The bicycle lock mounting bracket in accordance with claim 1, wherein said frame clamp (10) contains a locking depression (101), and said clamp latch (12) includes a locking block (121) mating with said locking depression (101).

6. The bicycle lock mounting bracket in accordance with claim 1, wherein said locking depression (101) has a polygonal shape, and said locking block (121) has a polygonal shape mating with that of said locking depression (101).

7. The bicycle lock mounting bracket in accordance with claim 1, wherein said lock clamp (20) includes a body (25) having a closed sidewall and an open sidewall, a strap (23) extending from said closed sidewall of said body (25) and having a distal end (230) received in said open sidewall of said body (25).

8. The bicycle lock mounting bracket in accordance with claim 7, wherein said body (25) of said lock clamp (20) contains a channel (250) which extends through said open sidewall to receive said distal end (230) of said strap (23), and contains a locking hole (252) defined in said closed sidewall, and said distal end (230) of said strap (23) contains a locking bore (232) aligning with said locking hole (252).

9. The bicycle lock mounting bracket in accordance with claim 8, wherein said channel (250) contains a retaining groove (251), and said distal end (230) of said strap (23) includes a locking piece (231) detachably received in said retaining groove (251).

10. The bicycle lock mounting bracket in accordance with claim 7, wherein said body (25) of said lock clamp (20) includes an arcuate limit post (24) extending from said open sidewall thereof.

11. The bicycle lock mounting bracket in accordance with claim 10, wherein said strip (23) includes multiple first teeth (234), and said limit post (24) includes an inner wall formed with multiple second teeth (240) aligning with said first teeth (234).

12. The bicycle lock mounting bracket in accordance with claim 1, wherein said locking recess (144) of said clamp latch (12) has a square shape, and said insert (21) of said lock clamp (20) has a square shape mating with that of said locking recess (144).

* * * * *